US012579518B2

(12) United States Patent
Zweig et al.

(10) Patent No.: US 12,579,518 B2
(45) Date of Patent: Mar. 17, 2026

(54) SYSTEMS AND METHODS FOR PROVIDING CROSS-SECTIONAL SCALING

(71) Applicant: Revelio Labs, Inc., New York, NY (US)

(72) Inventors: Ben Zweig, Stamford, CT (US); Daniel Max Firester, Brooklyn, NY (US); Bruce David Langford, Clifton, NJ (US); Praxal S. Patel, New York, NY (US); Jason A. Bossert, Louisville, CO (US); Arnav Saxena, Castro Valley, CA (US)

(73) Assignee: Revelio Labs, Inc., New York, NY (US)

( * ) Notice: Subject to any disclaimer, the term of this patent is extended or adjusted under 35 U.S.C. 154(b) by 0 days.

(21) Appl. No.: 18/823,366

(22) Filed: Sep. 3, 2024

(65) Prior Publication Data

US 2025/0078036 A1     Mar. 6, 2025

(51) Int. Cl.
G06F 16/00 (2019.01)
G06F 16/335 (2019.01)
G06Q 10/1053 (2023.01)

(52) U.S. Cl.
CPC ....... G06Q 10/1053 (2013.01); G06F 16/335 (2019.01)

(58) Field of Classification Search
CPC ........................... G06Q 10/1053; G06F 16/335
See application file for complete search history.

(56) References Cited

U.S. PATENT DOCUMENTS

| | | | |
|---|---|---|---|
| 12,073,344 | B2 | 8/2024 | Zweig |
| 2003/0182171 | A1* | 9/2003 | Vianello ........ G06Q 10/063112 |
| | | | 705/7.14 |
| 2019/0188742 | A1* | 6/2019 | Vasudevan ..... G06Q 10/063112 |

FOREIGN PATENT DOCUMENTS

| | | | | |
|---|---|---|---|---|
| CN | 110852722 A | * | 2/2020 | ......... G06F 16/2465 |
| KR | 20220008645 A | * | 1/2022 | ............. G06N 20/00 |
| KR | 102718310 B1 | * | 10/2024 | ......... G06Q 30/0251 |

* cited by examiner

*Primary Examiner* — Alexander Khong
(74) *Attorney, Agent, or Firm* — Lowenstein Sandler LLP

(57) ABSTRACT

Cross-sectional scaling of electronically available occupational profile data to represent a workforce of individuals at one or more companies is described. Raw online occupational profile data does not accurately represent a company's workforce. Individuals in certain roles have a higher or lower likelihood of being represented electronically, and individuals in certain regions also have higher or lower likelihoods of being represented. Thus, simply aggregating available online data does not produce an accurate representation of a company's workforce. To overcome this and/or other problems, cross-sectional scaling techniques are used to output an accurate representation of the workforce at one or more companies (e.g., for one or more occupations at a given company) based on the likelihoods that individuals have electronically available occupational profile data (which are determined based on determined occupational groups and regions where the one or more companies operate).

30 Claims, 3 Drawing Sheets

200

START

Determine groups of individuals by occupation
205

Compare quantities of individuals in determined occupational groups to reference quantities of individuals in corresponding occupational groups in domestic reference data
210

Aggregate company characteristics of one or more companies with a tuning factor and/or other information
215

Output a representation of the workforce of the individuals at the one or more companies based on the likelihoods that individuals have electronically available occupational profile data for each determined occupational group
220

END

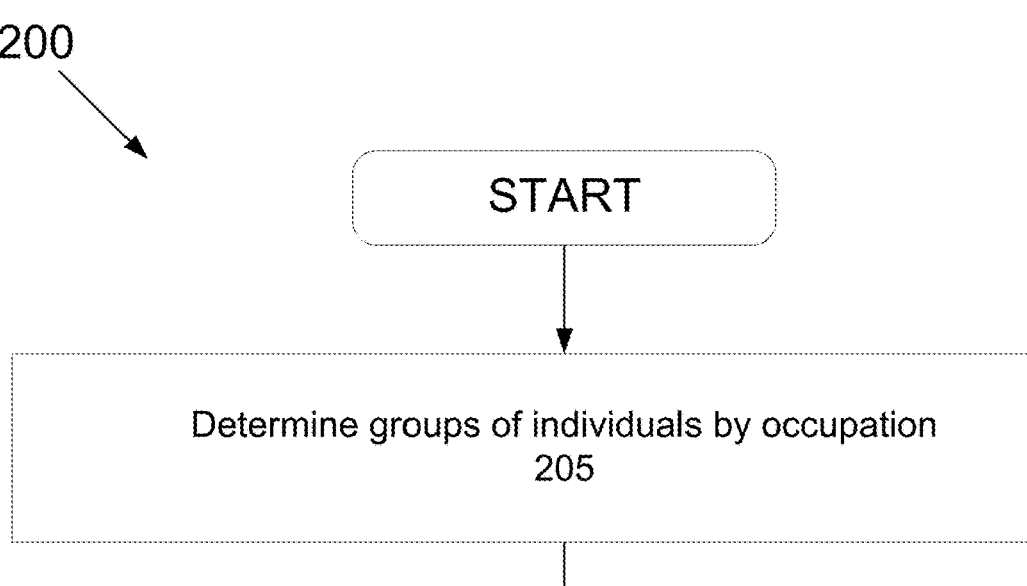

START

↓

Determine groups of individuals by occupation
205

↓

Compare quantities of individuals in determined occupational
groups to reference quantities of individuals in corresponding
occupational groups in domestic reference data
210

↓

Aggregate company characteristics of one or more companies with
a tuning factor and/or other information
215

↓

Output a representation of the workforce of the individuals at the
one or more companies based on the likelihoods that individuals
have electronically available occupational profile data for each
determined occupational group
220

↓

END

302

| Country | Raw Positions | Probability of Being Represented | Scaled Positions |
|---|---|---|---|
| United States | 1895 | 86% | 1739.37 |
| India | 803 | 45% | 1887.44 |
| Spain | 145 | 55% | 253.880 |
| Italy | 169 | 61% | 279.49 |
| United Kingdom | 354 | 84% | 242.88 |
| Germany | 95 | 81% | 117.28 |
| Brazil | 71 | 57% | 101.69 |
| China | 77 | 28% | 273.80 |
| Israel | 73 | 79% | 98.63 |
| France | 64 | 71% | 90.18 |
| Other | 564 | 66% | 1028.45 |
| | Raw Total = 3733 | | Total after Scaling = 6167.56 |

300

SYSTEMS AND METHODS FOR PROVIDING CROSS-SECTIONAL SCALING

CROSS-REFERENCE TO RELATED APPLICATION

This application claims priority to U.S. Provisional Application No. 63/579,883, filed Aug. 31, 2023.

FIELD OF THE INVENTION

This description relates to cross sectional scaling of electronically available occupational profile data to represent a workforce of individuals at one or more companies.

BACKGROUND

Raw online occupational profile data does not accurately represent a company's workforce. Individuals in certain roles have a higher or lower likelihood of being represented electronically (e.g., on LinkedIn or other similar sources), and individuals in certain regions also have higher or lower likelihoods of being represented. Thus, simply aggregating available online data does not produce an accurate representation of a company's workforce. Presently available systems do not account for these inconsistencies.

BRIEF DESCRIPTION OF THE INVENTION

Cross-sectional scaling of available data to account for missing data in a dataset is described. Analyses based on incomplete data usually generate inaccurate output. Some datasets may only include a partial set of entries, may have various missing data, and/or may be incomplete in another way. For example, for an occupational profile dataset (e.g., collected from online sources, stored in a database, etc.), available data may only include data for certain occupations, data for certain countries or cites, etc. An analysis based on such data may produce accurate outputs for some occupations but not others, some cities or countries but not others, etc. based on what data was actually included in the dataset. Prior attempts at solutions to this problem of determining, finding, and/or adding missing data back into a database often involve averaging or extrapolation, which may not always be possible (e.g., if whole categories of data are missing), may be inaccurate (e.g., if two datapoints are sufficiently far apart that their aggregation does not produce accurate representations), or may have other problems. Cross-sectional scaling of available data (e.g., to complete an incomplete dataset) is a technical solution to the technical problem created by missing, unavailable, and/or otherwise incomplete data.

As one example practical application (and continuing with the example above), cross-sectional scaling of electronically available occupational profile data to represent a workforce of individuals at one or more companies is described. Occupational profile data is widely available for various companies (e.g., on LinkedIn or similar sources, in government databases, etc.). However, the profile data typically represents only a sample of all employees who affiliate with a company. For example, as described above, individuals in certain roles have a higher or lower likelihood of being represented electronically (e.g. individuals in white collar positions have a higher likelihood of being represented in an online profile than those in blue collar positions), and individuals in certain regions also have higher or lower likelihoods of being represented (e.g. people in big cities or certain countries have a higher likelihood of being represented in an online profile than people in small cities or other countries). If at least electronically available occupational profile data represented a random sample of employees, a simple scaling variable might be applied to this data to produce workforce estimates for a company. But even this is not the case (e.g., because those in different roles, in different regions, etc., have different likelihoods of having available occupational profile data). To overcome these and/or other problems, cross-sectional scaling techniques are used with available occupational profile data to output an accurate representation of the workforce at one or more companies. For example, overall headcount at a company may be determined and included as part of the representation, head count for a specific occupational role, head count in certain geographic regions (e.g., cities or countries), how head counts change over time, etc. These techniques utilize likelihoods that individuals have electronically available occupational profile data (based on determined occupational groups, regions where the one or more companies operate, and/or other information) to accurately determine workforce representations.

According to some embodiments, there are provided systems and methods for cross-sectional scaling of electronically available occupational profile data to represent a workforce of individuals at one or more companies. These systems and methods may be, include, and/or be performed on a computer having a memory, a processor, and one or more code sets stored in the memory and executing in the processor. Some embodiments are configured to determine groups of individuals by occupation based on the electronically available occupational profile data and occupation designations in domestic reference data; compare quantities of individuals in determined occupational groups to reference quantities of individuals in corresponding occupational groups in the domestic reference data to determine likelihoods that individuals have electronically available occupational profile data for each determined occupational group; aggregate company characteristics of the one or more companies together with a tuning factor configured to bound a represented workforce to determine likelihoods that individuals in non-domestic countries have electronically available occupational profile data (with the company characteristics determined based on international reference data); and output a representation of the workforce of the individuals at the one or more companies based on the likelihoods that individuals have electronically available occupational profile data for each determined occupational group and the likelihoods that individuals in non-domestic countries have electronically available occupational profile data.

In some embodiments, the quantities of individuals in the determined occupational groups are counted by the processor. The reference quantities of individuals in the corresponding occupational groups in the domestic reference data are obtained by the processor electronically. The comparing comprises determining, with the processor, ratios of the quantities of individuals in the determined occupational groups to the reference quantities of individuals in the corresponding occupational groups in the domestic reference data.

In some embodiments, the company characteristics comprise an urban share, an employee share, and a sector share of the one or more companies. The urban share is an indication of whether a company is primarily based in cities. The employee share is an indication of whether a company directly hires employees, who are distinguished from self-employed workers and/or contractors. The sector share is an indication of what portion of a company's workforce is in industry and/or services, versus agriculture.

In some embodiments, the aggregating comprises determining, with the processor, a product of the urban share, the employee share, and the sector share raised to an exponent comprising the tuning factor. A value of the tuning factor is between 0.33 and 1.00. In some embodiments, a choice of the value of the tuning factor is validated by the processor based on observable lower bounds comprising published employee counts for the one or more companies in the domestic reference data and/or the international reference data, and/or an quantity of employees of the one or more companies with online profiles in an online profile database. In some embodiments, the processor is configured to iteratively adjust the value of the tuning factor between 0.33 and 1.00 until validation criteria are satisfied.

In some embodiments, the domestic reference data comprises official employment counts by occupation (e.g., from the United States Bureau of Labor Statistics), and the international reference data comprises data from an international labor organization (e.g., the ILO).

In some embodiments, the output representation of the workforce is determined by taking a product of the likelihoods that individuals have electronically available occupational profile data for each determined occupational group and the likelihoods that individuals in non-domestic countries have electronically available occupational profile data.

In some embodiments, determining the groups of individuals by occupation is based on a labeled database of job titles mapped to occupations. The labeled database of job titles mapped to occupations comprises job codes representative of various job families and increasing levels of job granularity within a job family. The processor is configured to train a neural network to hierarchically map raw job titles to the job codes starting with a job family and proceeding through more detailed levels of granularity.

In some embodiments, determining the groups of individuals by occupation comprises collecting text of descriptions of a plurality of occupations from a plurality of profiles of the individuals, and concatenating all collected profile data into one textual representation for each occupation.

In some embodiments, the output representation of the workforce of individuals at the one or more companies comprises numbers of individuals working for the one or more companies, a quantity of individuals at the one or more companies with a given occupation, numbers of individuals working domestically and/or internationally, and/or numbers of individuals working in one or more specific countries.

In some embodiments, the electronically available occupational profile data comprises online professional profile data on a publicly accessible networking website.

In some embodiments, outputting the representation of the workforce of the individuals at the one or more companies comprises outputting the representation at least one of to a display and as a data set.

These and other aspects, features, and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. Embodiments, however, both as to organization and method of operation, together with objects, features and advantages thereof, may best be understood by reference to the following detailed description when read with the accompanied drawings. Embodiments are illustrated by way of example and not limitation in the figures of the accompanying drawings, in which like reference numerals indicate corresponding, analogous or similar elements, and in which:

FIG. 2 is a high-level diagram illustrating an example configuration of a method workflow for cross-sectional scaling of electronically available occupational profile data to represent a workforce of individuals at one or more companies according to at least one embodiment.

Figure 1:
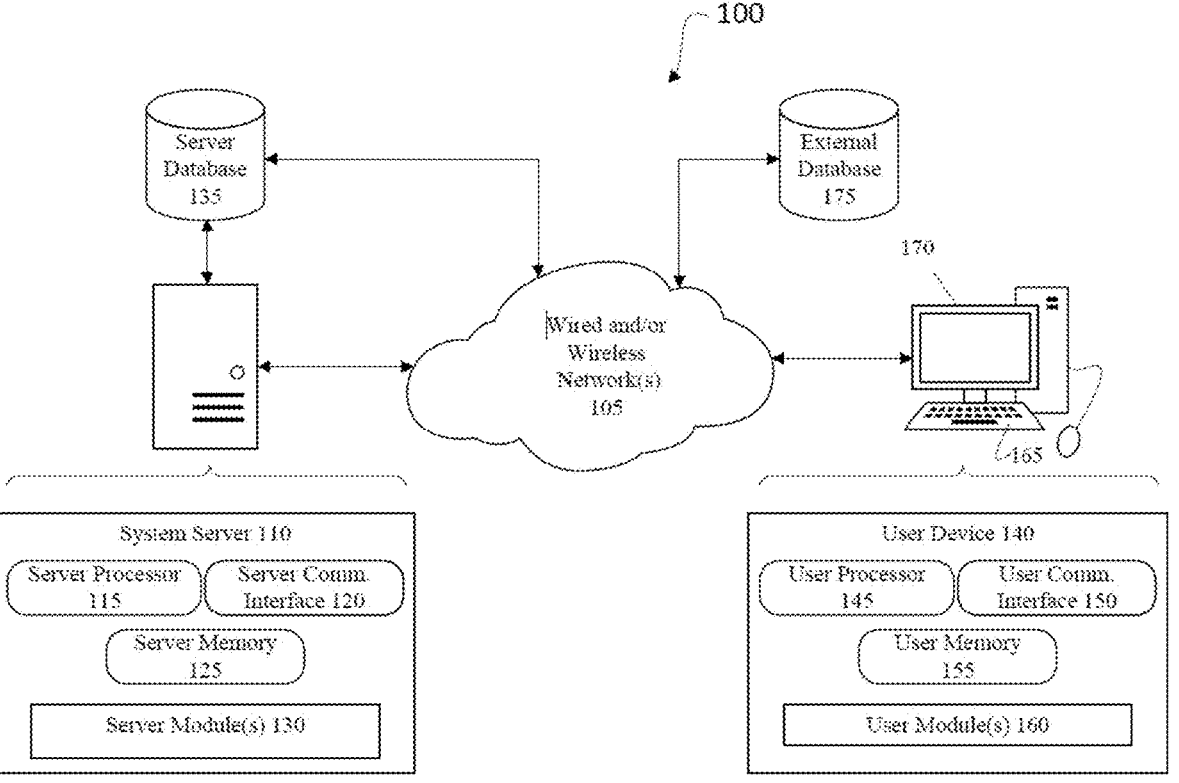
FIG. 1 shows a high-level diagram illustrating an example configuration of a system for performing one or more aspects of the techniques described herein, according to at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the detailed description herein, numerous specific details are set forth in order to provide a thorough understanding for the reader. However, it will be understood by those skilled in the art that the present techniques may be practiced without these specific details. In other instances, well-known methods, procedures, and components, modules, units and/or circuits have not been described in detail so as not to obscure aspects of the described techniques. Some features or elements described with respect to one embodiment may be combined with features or elements described with respect to other embodiments. For the sake of clarity, discussion of same or similar features or elements may not be repeated.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, one or more processors, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments provide systems and methods that can accurately represent a workforce of individuals at one or more companies even if all employees of a company do not have online profiles or other electronically available occupational profile data. Embodiments use the text of many (e.g., up to hundreds of millions) online professional profiles (occupational profile data). From the occupational profile data, the systems and methods described herein use cross-sectional scaling techniques to output accurate representations of the workforce at one or more companies based on the likelihoods that individuals have electronically available occupational profile data (based on determined occupational groups and regions where the one or more companies operate). To generate data that is representative of a true population, the present systems and methods employ sampling weights to adjust for occupation and location bias, as described herein.

FIG. 1 shows a high-level diagram illustrating an example configuration of a system 100 for performing one or more aspects of the operations described herein, according to at least one embodiment. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to embodiments as described in greater detail herein. Server processor 115 may be one or a number of processors, a central processing unit (CPU), a graphics processing unit (GPU), a multiprocessor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain embodiments, a server memory 125 is accessible by server processor 115, thereby enabling server processor 115 to receive and execute instructions such as code, stored in the memory and/or storage in the form of one or more software server modules 130, each module representing one or more code sets. The software server modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out one or more embodiments of the present system(s) and method(s), for example, executing code or software, and may execute the functionality of the modules as described herein.

In various embodiments of system 100 of FIG. 1, the exemplary software server modules may include a communication module, and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, software server modules 130 may include more or less actual modules which may be executed to enable these and other functionalities of the present system(s) and method(s). The modules described herein are therefore intended to be representative of the various functionalities of system server 110 in accordance with some embodiments. It should be noted that in accordance with various embodiments, software server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In some embodiments, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to occupational profile data. In some embodiments, database 135 may store information related to one or more aspects of the present system(s) and method(s).

As described herein, among the computing devices on or connected to the network 105 may be one or more user devices 140. User device 10 may be any standard computing device. As understood herein, in accordance with one or more embodiments, a computing device may be a stationary computing device, such as a desktop or laptop computer, tablet, smart device, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

External database 175, in some embodiments, includes sources of information such as databases, websites, etc.; external entities participating with system 100 (e.g., systems or networks associated with system 100), one or more servers outside of the system 100, another network (e.g., a private network associated with a company), additional electronic storage, equipment related to Wi-Fi™ technology, equipment related to Bluetooth® technology, data entry devices, or other resources. For example, external database 175 may include and/or otherwise represent domestic reference data comprising official employment counts by occupation from the United States Bureau of Labor Statistics, international reference data comprising data from the International Labor Organization, and/or other data. In some implementations, some or all of the functionality attributed herein to external database 175 may be provided by resources included in system 100. External database 175 may be configured to communicate with one or more other components of system 100 via wired and/or wireless connections, via a network (e.g., a local area network and/or the internet), via cellular technology, via Wi-Fi technology, and/or via other resources.

FIG. 2 is a high-level diagram illustrating an example configuration of a method workflow 200 for cross-sectional scaling of electronically available occupational profile data to represent a workforce of individuals at one or more companies, according to at least one embodiment. Method workflow 200 may be performed on a computer (e.g., system server 110) having a processor (e.g., server processor 115), memory (e.g., server memory 125), and one or more code sets or software (e.g., software server module(s) 130) stored in the memory and executing in or executed by the processor, for example.

As described above, occupational profile data that is widely available for various companies (e.g., on LinkedIn or similar sources, in government databases, etc.) typically represents only a sample of company employees who affiliate with a company. This occurs because the likelihood of individuals with different occupations, in different regions, etc., having available online occupational profile data varies. Since the likelihood of an individual having available occupational profile data is not constant, method workflow 200 (and related system(s) described herein) is configured to stratify observable data (e.g., the occupational profile data that is available online) for employees with different occupations, from different regions, etc. Phrased another way, method workflow 200 is configured to estimate the likelihood that each individual employee of a company has available occupational profile data, conditional on what data can be observed. These stratifications or estimations (e.g., cross-sectional scaling techniques) are used to accurately represent a workforce of individuals at one or more companies.

Estimating likelihoods requires proper categorization of employees into groups, estimation of a numerator from internal counts (e.g., a number of online profiles), estimation of a denominator from external benchmark data (e.g., to express a likelihood as a ratio or percentage), and/or other operations. Workflow 200 is configured such that a choice of possible occupational groups is based on commonalities in both the electronically available occupational profile data and external benchmark or reference data.

To accurately represent a workforce of individuals at one or more companies, workflow 200 adjusts its output for occupation and location bias. For example, if an engineer in the US has a 90% chance of having an online profile on LinkedIn or some other similar resource (e.g., according to workflow 200 based on electronically available occupational profile data as described herein), every engineer in the US with an online profile is considered to represent 1.1 US engineering employees in the US at a given company. If a nurse in Germany has a 25% chance of having an online profile, every nurse in Germany with an online profile is considered to represent four German nurses at the company (more details are provided below).

For cross-sectional scaling of electronically available occupational profile data to represent a workforce of individuals at one or more companies, workflow 200 probabilistically classifies different job titles (into different occupational groups) and locations according to reference government occupational codes. Observations in the dataset are stratified by occupation and country, aggregated and smoothed to account for potential misclassifications in government codes, and then compared with government level statistics on the total workforce. Detailed occupational breakdowns are available for the United States (e.g., using Bureau of Labor Statistics data), allowing inference of the likelihood of an individual's representation in electronically available occupational data. Workflow 200 extrapolates to other countries using international statistics (e.g., using International Labor Organization reference data) with a similar methodology. The likelihood of representation is assumed independent between occupation and country, and a final likelihood of representation is generated by combining occupation and country likelihoods (as described below). Output (e.g., an output representation of cross-sectionally scaled occupational profile data) from workflow 200 may include, for example, overall headcount at a company, head count for a specific occupational role, head count in certain geographic regions (e.g., cities or countries), how head counts change over time, etc.

Method workflow 200 begins at step 205, when the processor (e.g., server processor 115 shown in FIG. 1 and described above) is configured to determine groups of individuals by occupation. These groups are determined based on electronically available occupational profile data, occupation designations in domestic reference data, and/or other information. The occupational profile data, occupation designations in domestic reference data, and/or other information may include job titles and/or other descriptors, for example. In some embodiments, the electronically available occupational profile data comprises online professional profile data on a publicly accessible networking website (e.g., such as LinkedIn), data published by a company on its own website, and/or other available occupational profile data. In some embodiments, the domestic reference data comprises job titles, official employment counts by occupation, and/or other information from an official government source (e.g., the United States Bureau of Labor Statistics and/or other reference sources).

In some embodiments, determining the groups of individuals by occupation at step 205 may comprise collecting text of descriptions of a plurality of occupations from a plurality of profiles of the individuals, and concatenating all collected profile data into one textual representation for each occupation. For example, in some embodiments, step 205 utilizes a universal occupational taxonomy as a basis for determining the groups. The universal occupational taxonomy may be similar to and/or the same as the universal occupational taxonomy described in U.S. Pat. No. 12,073, 344, issued Aug. 27, 2024, and titled "Systems and Methods for Providing A Universal Occupational Taxonomy," which is hereby incorporated by reference in its entirety. Using a universal occupational taxonomy may ensure that job titles that appear in the electronically available occupational profile data, which refer to different occupations and seniority levels, and which may or may not be consistent within or across companies, can be consistently grouped into occupational groups (ensuring that like jobs are grouped with like jobs and that different jobs are classified into different groups).

In addition, in electronically available occupational profile data, many different company names that all refer to the same company may be observed (e.g. Bank of America and BofA both refer to the same company). Further, some entities are subsidiaries of others. These factors are important to resolve as part of step 205 and/or other steps of workflow 200 in order to determine accurate groups (e.g., in conjunction with the universal occupational taxonomy), and/or eventually an accurate representation of a workforce of individuals at one or more companies. As part of step 205, different occupations at the same company which appear in the electronically available occupational profile data (e.g., as determined by the processor) may be mapped to a common company identifier. Each subsidiary company may have its own identifier, but that identifier is tied to its parent company identifier as well. Grouping operations performed at step 205 may consider the company identifiers (e.g., and any associated universal occupational taxonomy), for example, when forming groups. This structure may enhance determination of groups of individuals by occupation within and across one or more companies, among other advantages.

In some embodiments, determining the groups of individuals by occupation may be based on a labeled database (which may include separate individual labeled databases together forming the labeled database) of job titles mapped to occupations and/or other information. The labeled database of job titles mapped to occupations comprises job codes representative of various job families and increasing levels of job granularity within a job family. The processor is configured to train a neural network to hierarchically map raw job titles to the job codes starting with a job family and proceeding through more detailed levels of granularity.

For example, in the US, reference employment counts may be obtained by the processor from a Bureau of Labor Statistics (BLS) database (e.g., which may be or be included in an external database 175 shown in FIG. 1 and described above). These may be organized by occupation, industry, and/or other factors. Based on the electronically available occupational profile data, and the data in the BLS database, the processor may count online profiles (in the electronically available occupational profile data) and obtain corresponding official counts from the BLS database to determine which segments of data have significant agreement and/or significant variance. Based on this analysis, occupation is a primary determinant of the likelihood of an individual having an online profile in the electronically available occupational profile data (whereas other factors such as industry, city, etc., did not). Hence, the processor is configured to is configured to determine groups of individuals by occupation (instead of some other possible category) in workflow 200 and system 100 (FIG. 1).

The data provided by the BLS database comprise codes which are organized by digits: XX-XXXX. The first two digits represent a job family and each subsequent digit represents a further level of granularity (e.g., down to the labeling of individual specific job titles in that job family). In this example, the processor is configured to map job titles to occupations through a labeled database (or dataset) provided by the Office of Foreign Labor Certification (OFLC) (which may also be included in system 100 as an external database 175 (FIG. 1), for example). The OFLC database comprises job titles manually (by a human) mapped to codes. The processor is configured to train a neural network model to hierarchically map raw job titles to the codes starting with the job family and progressing through more detailed levels of granularity.

At step 210, the processor (e.g., server processor 115 shown in FIG. 1 and described above) may compare quantities of individuals in determined occupational groups to reference quantities of individuals in corresponding occupational groups in the domestic reference data (e.g., in the BLS database described above), to determine likelihoods that individuals have electronically available occupational profile data for each determined occupational group. In some embodiments, the quantities of individuals in the determined occupational groups are counted by the processor. The reference quantities of individuals in the corresponding occupational groups in the domestic reference data are obtained by the processor electronically. The comparing comprises determining, with the processor, ratios of the quantities of individuals in the determined occupational groups to the reference quantities of individuals in the corresponding occupational groups in the domestic reference data.

For example, once the processor determines the occupational groups, and then groups the individuals into those groups (using individual profiles in the electronically available occupational profile data), the processor can count or sum a number for each group (e.g., frequencies for each group), and compare that number to reference quantities of individuals in corresponding reference occupational groups (e.g., in the BLS database). Comparing may comprise dividing the number in each group determined by the processor by a reference quantity. This ratio represents the likelihood of an individual in the US having an online profile included in the electronically available occupational profile data.

At step 215, in some embodiments, the processor (e.g., server processor 115 shown in FIG. 1 and described above) may aggregate company characteristics of the one or more companies together with a tuning factor and/or other information. The tuning factors is configured to bound a represented workforce (more on the tuning factor described below). The aggregation is configured to determine likelihoods that individuals in non-domestic countries have electronically available occupational profile data. The company characteristics are determined based on international reference data and/or other information. The international reference data may comprise data from the International Labor Organization (ILO) (e.g., another database that may be part of external database 175 shown in FIG. 1 and described above), for example, and/or other reference sources.

In some embodiments, the company characteristics comprise an urban share, an employee share, a sector share, and/or other characteristics of the one or more companies. The urban share is an indication of whether a company is primarily based in cities. The employee share is an indication of whether a company directly hires employees, who are distinguished from self-employed workers and/or contractors. The sector share is an indication of what portion of a company's workforce is in industry and/or services, versus agriculture, for example. These characteristics or indicators are correlated and provide a unique signal about the share of the workforce that is relevant to a population of interest-employees at large companies.

Data from the ILO, for example, is only available to be obtained (by the processor) one characteristic at a time, and is not able to be obtained at multiple organizational levels of depth (e.g., hierarchically sorted or similar). This presents an issue in combining these characteristics. Thus, in some embodiments, the aggregating comprises determining, with the processor, a product of the urban share, the employee share, and the sector share raised to an exponent comprising the tuning factor.

The value of the tuning factor may be between 0.33 and 1.00. A tuning factor exponent of 0.33 is the geometric mean of the company characteristics (e.g., the urban share, the employee share, and the sector share), which overestimates the relevant workforce. A tuning factor exponent of 1.00 is a product that underestimates the relevant workforce. The processor is configured to use the tuning factor to tune output workforce representations, for example. The tuning factor may be tuned by applying different tuning level values for different companies and evaluating the outputs.

For example, in some embodiments, a choice of the value of the tuning factor is validated by the processor based on observable lower bounds comprising published employee counts for the one or more companies in the domestic reference data and/or the international reference data, and/or a quantity of employees of the one or more companies with online profiles in an online profile database. Published employee counts are treated as an approximate lower bound. They are a lower bound because workflow 200 is configured to accounts for individuals employed by a company in any capacity as represented in the electronically available occupational profile data (who may or may not be included in published employee counts). The quantity of employees of the one or more companies with online profiles in an online profile database may include a quantity of employees with online profiles on LinkedIn, for example, or other similar online profile databases. This is an approximate (lower) bound because there is some share of LinkedIn users that keep their profiles private, and some lag in time when individuals update their profiles. This is a lower bound because the processor obtains this data and/or other similar data from these professional online profile sites, and also because the cross-sectional scaling in workflow 200 is configured to adjust counts upward to address differences in the likelihood of someone having an online profile (which is bound at 1.00).

In some embodiments, the processor is configured to iteratively adjust the value of the tuning factor between 0.33 and 1.00 until validation criteria are satisfied. The validation criteria may reflect the observable lower bounds described above, and/or other requirements. For example, the processor may be configured to iteratively adjust the value of the tuning factor between 0.33 and 1.00 until an output workforce representation comprises a number of individuals that is greater than the published employee count for a company in the domestic reference data and/or the international reference data, and/or greater than a quantity of employees at the company with online profiles in an online profile database. By exploring these lower bounds, tuning enhances the accuracy of sampling weights to adjust for location bias (e.g., the value of the product of the country characteristics raised to the tuning factor exponent described above).

At step 220, the processor (e.g., server processor 115 shown in FIG. 1 and described above) is configured to output a representation of the workforce of the individuals at the one or more companies based on the likelihoods that individuals have electronically available occupational profile data for each determined occupational group, the likelihoods that individuals in non-domestic countries have electronically available occupational profile data, and/or other information. In some embodiments, the output representation of the workforce is determined by taking and/or otherwise based on a product of the likelihoods that individuals have electronically available occupational profile data for each determined occupational group and the likelihoods that individuals in non-domestic countries have electronically available occupational profile data.

Returning to an example described above, if an engineer at a company has a 90% chance of having an online profile, the product of the likelihood that an engineer has an electronically available occupational profile and the likelihood that the engineer has electronically available occupational profile data based on the engineer's location is 0.90, or 90%. The engineer would be considered to represent 1.1 engineers at the company, such that in an eventual output representation of the workforce of the individuals at the company, a number of engineers determined from the electronically available occupational profile data would be multiplied by 1.1 in the output from workflow 200.

In some embodiments, the output representation of the workforce of individuals at the one or more companies comprises numbers of individuals working for the one or more companies (as in the example above), a quantity of individuals at the one or more companies with a given occupation, numbers of individuals working domestically and/or internationally, numbers of individuals working in one or more specific countries, how these numbers of individuals change over time, and/or other representations. Outputting the representation of the workforce of the individuals at the one or more companies comprises outputting the representation at least one of to a display and as a data set, and/or in other forms.

Figure 3:
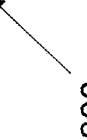
FIG. 3 illustrates an example of an output representation of a workforce of individuals at a company, according to at least one embodiment.

For example, FIG. 3 illustrates one possible output representation 300 of the workforce of individuals at a company. Output representation 300 takes the form of a table 302 in this example. Table 302 comprises numbers of individuals working for the company in specific countries. Table 302 includes a country column, a raw positions column, a probability of being represented column, and a scaled number of positions column. The raw positions column includes the quantities of individuals determined to be located in the different countries based on raw counts from the electronically available occupational profile data by the processor. The probability of being represented column presents the percentage likelihood that an individual would have an online profile in the electronically available occupational profile data (e.g., determined based on the product of the likelihood that an individual has an electronically available occupational profile based on their occupation, and the likelihood that the individual has electronically available occupational profile data based on their location (or country in this example) as described herein). The scaled positions column presents a more accurate representation of the workforce of individuals at the company after cross-sectional scaling techniques are applied. As shown in FIG. 3, after taking the cross-sectional scaling probability into account (e.g., see step 225 of workflow 200 in FIG. 2) the actual number of individuals in the workforce of the company is approximately 2,300 more than what would have been determined based on the raw positions total. Note that FIG. 3 includes the raw positions column primarily for demonstration purposes. In actual implementations, output representation 300 may only include the country column, the probability of being represented column, and/or the scaled positions column, for example.

Returning to FIG. 2, with this series of steps 205-220, embodiments of the present systems (e.g., system 100 shown in FIG. 1) and methods (e.g., workflow 200 shown in FIG. 2) provide cross-sectional scaling of electronically available occupational profile data to more accurately represent a workforce of individuals at one or more companies compared to prior systems and methods. Embodiments of the present systems and methods provide a significant real-world benefit and improvement compared to prior art systems and methods. For example, as explained above, occupational profile data is widely available for various companies (e.g., on LinkedIn or similar sources, in government databases, etc.). However, the profile data typically represents only a sample of all employees who affiliate with a company. Individuals in certain roles have a higher or lower likelihood of being represented electronically (e.g. individuals in white collar positions have a higher likelihood of being represented in an online profile than those in blue collar positions), and individuals in certain regions also have higher or lower likelihoods of being represented (e.g. people in big cities or certain countries have a higher likelihood of being represented in an online profile than people in small cities or other countries). As such, electronic systems that collect and summarize this data from available electronic sources do not provide accurate results. In addition, because the electronically available occupational profile data does not even represent a random sample of employees, a simple scaling variable cannot be applied to this data (e.g., by such prior systems) to produce workforce estimates for a company. Furthermore, much less significant computing and storage resources may be needed because such resources need not scour every potentially available source for information, and then store all related data, in an effort to enhance accuracy. In contrast, the present systems and methods need only use easily electronically available occupational profile data to more accurately (compared to these prior systems) represent a workforce of individuals at one or more companies.

Embodiments likewise provide a practical application of cross-sectional scaling techniques, e.g., by generating visual graphics and/or other outputs which benefit end-users who are able to then implement real-world decisions and objectives based on clearly provided and easily understood information. Cross-sectional scaling techniques are used with available occupational profile data to output an accurate representation of the workforce at one or more companies. These techniques utilize likelihoods that individuals have electronically available occupational profile data (based on determined occupational groups, regions where the one or more companies operate, and/or other information) to accurately determine workforce representations. More accurate workforce determinations enhances implemented real-world decisions and objectives (e.g., related to resource alignment, advertising and marketing expenditures, recruiting objectives, facility related expenditures, etc.) for a company (for example). As one specific example, overall headcount at a company may be determined and included as part of a representation, head count for a specific occupational role, head count in certain geographic regions (e.g., cities or countries), how head counts change over time, etc. This head count information can be used to implement real-world decisions and objectives as described above.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for cross-sectional scaling of electronically available profile data, the method comprising:

determining, with a processor, a set of occupation-based profile groups based on the electronically available profile data and occupation designations in domestic reference data, comparing, with the processor, quantities of the set of occupation-based profile groups to reference quantities in corresponding groups in the domestic reference data, to determine likelihoods that electronically available profile data exists for the set of occupation-based profile groups;

aggregating, with the processor, one or more of an urban share, an employee share, or a sector share of one or more companies with a tuning factor, to determine likelihoods that individuals in non-domestic countries have electronically available profile data and one or more off the urban share, the employee share, or the sector share determined based on international reference data; and outputting, by the processor, a representation of cross-sectionally scaled electronically available profile data based on the likelihoods that electronically available profile data exists for the set of occupation-based profile groups and the likelihoods that individuals in non-domestic countries have electronically available profile data, wherein the representation describes at least a portion of a workforce of individuals at the one or more companies.

2. The method of claim 1, wherein the quantities of the set of occupation-based profile groups are counted by the processor, the reference quantities in the corresponding groups in the domestic reference data are obtained by the processor electronically, and the comparing comprises determining, with the processor, ratios of the quantities in the set of occupation-based profile groups to the reference quantities in the corresponding groups in the domestic reference data.

3. The method of claim 1, wherein the aggregating comprises determining, with the processor, the one or more of the urban share, the employee share, or the sector share raised to an exponent comprising the tuning factor.

4. The method of claim 3, wherein a value of the tuning factor is between 0.33 and 1.00.

5. The method of claim 4, further comprising validating, with the processor, a choice of the value of the tuning factor based on observable lower bounds comprising one or more of:

published counts for one or more companies in one or more of the domestic reference data or the international reference data, or a quantity of employees of the one or more companies with online profiles in an online profile database.

6. The method of claim 5, further comprising iteratively adjusting, with the processor, the value of the tuning factor between 0.33 and 1.00 until validation criteria are satisfied.

7. The method of claim 1, wherein the domestic reference data comprises official government employment counts by occupation, and the international reference data comprises data from an international labor organization.

8. The method of claim 1, wherein the representation output by the processor is determined by taking a product of the likelihoods that electronically available profile data exists for the set of occupation-based profile groups and the likelihoods that individuals in non-domestic countries have electronically available profile data.

9. The method of claim 1, wherein determining the set of occupation-based profile groups is based on a labeled database of job titles mapped to occupations, wherein the labeled database of job titles mapped to occupations comprises job codes representative of various job families and increasing levels of job granularity within a job family.

10. The method of claim 9, wherein the processor is configured to train a neural network to hierarchically map raw job titles to the job codes starting with a job family.

11. The method of claim 1, wherein determining the set of occupation-based profile groups comprises: collecting, by the processor, text of descriptions of a plurality of occupations from a plurality of profiles; and concatenating, by the processor, all collected profile data into one textual representation for each occupation.

12. The method of claim 1, wherein the representation comprises one or more of: numbers of individuals working for one or more companies, a quantity of individuals at the one or more companies with a given occupation, numbers of individuals working domestically, numbers of individuals working internationally, or numbers of individuals working in one or more specific countries.

13. The method of claim 1, wherein the electronically available profile data comprises online professional profile data on a publicly accessible networking website.

14. The method of claim 1, wherein the urban share is an indication of whether a company is primarily based in cities; the employee share is an indication of whether a company directly hires employees, which are distinguished from self-employed workers; and the sector share is an indication of what portion of a company is in industry or services, versus agriculture.

15. The method of claim 1, wherein the representation is outputted to a display.

16. A system for cross-sectional scaling of electronically available profile data, comprising:

a memory;

a processor; and one or more code sets stored in the memory and executing in the processor which, when executed, cause the processor to perform operations comprising:

determining a set of occupation-based profile groups based on the electronically available profile data and occupation designations in domestic reference data;

comparing quantities of the set of occupation-based profile groups to reference quantities in corresponding groups in the domestic reference data, to determine likelihoods that electronically available profile data exists for the set of occupation-based profile groups;

aggregating one or more of an urban share, an employee share, or a sector share of one or more companies with a tuning factor, to determine likelihoods that individuals in non-domestic countries have electronically available profile data and one or more off the urban share, the employee share, or the sector share determined based on international reference data; and outputting a representation of cross-sectionally scaled electronically available profile data based on the likelihoods that electronically available profile data exists for the set of occupation-based profile groups and the likelihoods that individuals in non-domestic countries have electronically available profile data, wherein the representation describes at least a portion of a workforce of individuals at the one or more companies.

17. The system of claim 16, wherein the quantities of the set of occupation-based profile groups are counted by the processor, the reference quantities in the corresponding groups in the domestic reference data are obtained by the processor electronically, and the comparing comprises determining, with the processor, ratios of the quantities in the set of occupation-based profile groups to the reference quantities in the corresponding groups in the domestic reference data.

18. The system of claim 16, wherein the aggregating comprises determining, with the processor, the one or more of the urban share, the employee share, or the sector share raised to an exponent comprising the tuning factor.

19. The system of claim 18, wherein a value of the tuning factor is between 0.33 and 1.00.

20. The system of claim 19, wherein the operations further comprise validating a choice of the value of the tuning factor based on observable lower bounds comprising one or more of:

published counts for one or more companies in one or more of the domestic reference data and the international reference data, or a quantity of employees of the one or more companies with online profiles in an online profile database.

21. The system of claim 20, wherein the operations further comprise iteratively adjusting, with the processor, the value of the tuning factor between 0.33 and 1.00 until validation criteria are satisfied.

22. The system of claim 16, wherein the domestic reference data comprises official employment counts by occupation, and the international reference data comprises data from an international labor organization.

23. The system of claim 16, wherein the representation output by the processor is determined by taking a product of the likelihoods that electronically available profile data exists for the set of occupation-based profile groups and the likelihoods that individuals in non-domestic countries have electronically available profile data.

24. The system of claim 16, wherein determining the set of occupation-based profile groups is based on a labeled database of job titles mapped to occupations, wherein the labeled database of job titles mapped to occupations comprises job codes representative of various job families and increasing levels of job granularity within a job family.

25. The system of claim 24, wherein the operations further comprise training a neural network to hierarchically map raw job titles to the job codes starting with a job family.

26. The system of claim 16, wherein determining the set of occupation-based profile groups comprises: collecting, by the processor, text of descriptions of a plurality of occupations from a plurality of profiles; and concatenating, by the processor, all collected profile data into one textual representation for each occupation.

27. The system of claim 16, wherein the representation comprises one or more of: numbers of individuals working for one or more companies, a quantity of individuals at the one or more companies with a given occupation, numbers of individuals working domestically, numbers of individuals working internationally, or numbers of individuals working in one or more specific countries.

28. The system of claim 16, wherein the electronically available profile data comprises online professional profile data on a publicly accessible networking website.

29. The system of claim 16, wherein the urban share is an indication of whether a company is primarily based in cities; the employee share is an indication of whether a company directly hires employees, which are distinguished from self-employed workers; and the sector share is an indication of what portion of a company is in industry or services, versus agriculture.

30. The system of claim 16, wherein the representation is outputted to a display.

\* \* \* \* \*